US00RE46405E

(19) United States
(12) Reissued Patent
Michel

(10) Patent Number: US RE46,405 E
(45) Date of Reissued Patent: May 16, 2017

(54) COMMUNITY WAGERING GAME WITH MULTIPLE PLAYER SELECTIONS

(71) Applicant: WMS Gaming, Inc., Waukegan, IL (US)

(72) Inventor: Jeffrey E Michel, Deerfield, IL (US)

(73) Assignee: Bally Gaming, Inc., Las Vegas, NV (US)

(21) Appl. No.: 14/044,154

(22) Filed: Oct. 2, 2013

Related U.S. Patent Documents

Reissue of:
(64) Patent No.: 8,460,087
Issued: Jun. 11, 2013
Appl. No.: 12/298,682
PCT Filed: Apr. 26, 2007
PCT No.: PCT/US2007/010049
§ 371 (c)(1),
(2) Date: Oct. 27, 2008
PCT Pub. No.: WO2007/127259
PCT Pub. Date: Nov. 8, 2007

U.S. Applications:
(60) Provisional application No. 60/795,631, filed on Apr. 27, 2006.

(51) Int. Cl.
*A63F 9/24* (2006.01)
*G07F 17/32* (2006.01)

(52) U.S. Cl.
CPC ..... *G07F 17/32* (2013.01); *G07F 17/3276* (2013.01)

(58) Field of Classification Search
CPC ..... G07F 17/3276; G07F 17/32
USPC ..... 463/20, 17, 27, 42
See application file for complete search history.

(56) References Cited

U.S. PATENT DOCUMENTS

| | | | | |
|---|---|---|---|---|
| 4,624,459 | A | 11/1986 | Kaufman | 273/143 R |
| 4,837,728 | A | 6/1989 | Barrie et al. | 364/412 |
| 4,948,134 | A | 8/1990 | Suttle et al. | 273/85 |
| 5,083,271 | A | 1/1992 | Thacher et al. | |
| 5,116,055 | A | 5/1992 | Tracy | 273/138 A |
| 5,249,800 | A | 10/1993 | Hilgendorf et al. | 273/138 A |
| 5,275,400 | A | 1/1994 | Weingardt et al. | 463/85 CP |
| 5,280,909 | A | 1/1994 | Tracy | 273/138 R |
| 5,344,144 | A | 9/1994 | Canon | 273/138 A |

(Continued)

FOREIGN PATENT DOCUMENTS

| | | | | |
|---|---|---|---|---|
| CA | 2 334 546 | A1 | 8/2001 | G07F 17/34 |
| DE | 195 15 983 | A1 | 11/1996 | G07F 17/34 |

(Continued)

OTHER PUBLICATIONS

International Preliminary Report on Patentability corresponding to PCT International Application No. PCT/US2007/010049, dated Oct. 28, 2008; 6 pages.

(Continued)

*Primary Examiner* — Jeffrey R Jastrzab
(74) *Attorney, Agent, or Firm* — Nixon Peabody LLP

(57) ABSTRACT

A gaming system for conducting a wagering game includes a plurality of linked gaming machines for receiving multiple player selections in a community bonus game. The community bonus game may be displayed to all players at the linked gaming machines on a community display. Upon receiving multiple player selections in the community bonus game, players are awarded bonus awards based on the respective player selections.

20 Claims, 10 Drawing Sheets

(56) References Cited

U.S. PATENT DOCUMENTS 5,377,973 A 1/1995 Jones et al. ..... 273/85 CP
5,393,057 A 2/1995 Marnell, II ..... 273/85 CP
5,524,888 A 6/1996 Heidel ..... 463/22
5,544,892 A 8/1996 Breeding ..... 273/292
5,564,700 A 10/1996 Celona ..... 463/27
5,580,063 A 12/1996 Edwards ..... 273/378
5,580,309 A 12/1996 Piechowiak et al. ..... 463/16
5,611,730 A 3/1997 Weiss ..... 463/20
5,645,486 A 7/1997 Nagao et al. ..... 463/27
5,655,961 A 8/1997 Acres et al. ..... 463/27
5,711,715 A 1/1998 Ringo et al.
5,755,621 A 5/1998 Marks et al.
5,766,076 A 6/1998 Pease et al. ..... 463/27
RE35,864 E 7/1998 Weingardt ..... 463/28
5,779,242 A 7/1998 Kaufmann
5,779,549 A 7/1998 Walker et al. ..... 463/42
5,803,063 A 9/1998 Corey
5,816,918 A 10/1998 Kelly et al. ..... 463/16
5,823,874 A 10/1998 Adams ..... 463/17
5,830,063 A 11/1998 Byrne ..... 463/18
5,848,932 A 12/1998 Adams ..... 463/20
5,855,515 A 1/1999 Pease et al. ..... 463/27
5,876,284 A 3/1999 Acres et al. ..... 463/25
5,885,158 A 3/1999 Torango et al. ..... 463/27
5,941,773 A 8/1999 Harlick ..... 463/26
6,007,427 A 12/1999 Wiener et al. ..... 463/17
6,012,982 A 1/2000 Piechowiak et al. ..... 463/16
6,022,026 A * 2/2000 Johnson, III ..... 273/450
6,039,648 A 3/2000 Guinn et al. ..... 463/16
6,047,963 A 4/2000 Pierce et al. ..... 273/121 B
6,077,162 A 6/2000 Weiss ..... 463/26
6,089,977 A 7/2000 Bennett ..... 463/20
6,089,980 A 7/2000 Gauselmann ..... 463/27
6,093,100 A 7/2000 Singer et al.
6,102,474 A 8/2000 Daley ..... 296/836
6,102,798 A 8/2000 Bennett ..... 463/16
6,102,799 A 8/2000 Stupak ..... 463/27
6,110,043 A 8/2000 Olsen ..... 463/27
6,139,013 A 10/2000 Pierce et al. ..... 273/121 B
6,142,872 A 11/2000 Walker et al. ..... 463/16
6,146,273 A 11/2000 Olsen ..... 463/27
6,155,925 A 12/2000 Giobbi et al. ..... 463/20
6,158,741 A 12/2000 Koelling ..... 273/292
6,159,097 A 12/2000 Gura ..... 463/20
6,168,523 B1 1/2001 Piechowiak et al. ..... 463/26
6,203,010 B1 3/2001 Jorasch et al. ..... 273/138.1
6,206,374 B1 3/2001 Jones ..... 273/292
6,206,782 B1 3/2001 Walker et al. ..... 463/25
6,210,275 B1 4/2001 Olsen ..... 463/16
6,210,277 B1 4/2001 Stefan ..... 463/27
6,217,448 B1 4/2001 Olsen ..... 463/25
6,220,593 B1 4/2001 Pierce et al. ..... 273/138.1
6,224,482 B1 5/2001 Bennett ..... 463/20
6,224,484 B1 5/2001 Okuda et al. ..... 463/27
6,224,486 B1 5/2001 Walker et al.
6,231,445 B1 5/2001 Acres ..... 463/42
6,254,483 B1 7/2001 Acres ..... 463/26
6,287,202 B1 9/2001 Pascal et al.
6,293,865 B1 9/2001 Kelly et al.
6,309,299 B1 10/2001 Weiss
6,312,332 B1 11/2001 Walker et al. ..... 463/23
6,315,660 B1 11/2001 DeMar et al. ..... 463/16
6,319,125 B1 11/2001 Acres ..... 463/25
6,319,127 B1 11/2001 Walker et al. ..... 463/26
6,336,859 B2 1/2002 Jones et al. ..... 463/13
6,336,862 B1 1/2002 Byrne ..... 463/27
6,345,824 B1 2/2002 Selitzky ..... 273/292
6,358,149 B1 3/2002 Schneider et al. ..... 463/27
6,361,441 B1 3/2002 Walker et al. ..... 463/42
6,364,314 B1 4/2002 Canterbury
6,364,768 B1 4/2002 Acres et al. ..... 463/25
6,375,567 B1 4/2002 Acres ..... 463/25
6,375,568 B1 4/2002 Roffman et al. ..... 463/26
6,416,408 B2 7/2002 Tracy et al. ..... 463/16
6,416,409 B1 7/2002 Jordan ..... 463/27
6,422,940 B1 7/2002 Walker et al. ..... 463/13
6,425,828 B2 7/2002 Walker et al.
6,431,983 B2 8/2002 Acres ..... 463/25
6,435,968 B1 8/2002 Torango ..... 463/27
6,439,995 B1 8/2002 Hughs-Baird et al. ..... 463/20
6,443,840 B2 * 9/2002 Von Kohorn ..... 463/17
6,482,089 B2 11/2002 DeMar et al. ..... 463/20
6,503,146 B2 1/2003 Walker et al.
6,506,117 B2 1/2003 DeMar et al. ..... 463/20
6,508,707 B2 1/2003 DeMar et al. ..... 463/16
6,517,433 B2 2/2003 Loose et al. ..... 463/20
6,520,855 B2 2/2003 DeMar et al. ..... 463/20
6,575,829 B2 * 6/2003 Coleman et al. ..... 463/20
6,589,115 B2 7/2003 Walker et al. ..... 463/25
6,592,460 B2 7/2003 Torango ..... 463/27
6,599,186 B1 7/2003 Walker et al. ..... 463/17
6,599,188 B2 7/2003 Hirsch et al. ..... 463/19
6,599,193 B2 * 7/2003 Baerlocher et al. ..... 463/27
6,648,753 B1 11/2003 Tracy et al. ..... 463/16
6,648,762 B2 11/2003 Walker et al. ..... 463/25
6,692,354 B2 2/2004 Tracy et al. ..... 463/16
6,702,291 B2 * 3/2004 Grebler et al. ..... 273/292
6,712,695 B2 3/2004 Mothwurf et al. ..... 463/25
6,712,699 B2 3/2004 Walker et al. ..... 463/30
6,733,390 B2 5/2004 Walker et al. ..... 463/23
6,790,141 B2 9/2004 Muir ..... 463/42
6,800,026 B2 10/2004 Cannon
6,817,948 B2 11/2004 Pascal et al.
6,837,793 B2 1/2005 McClintic ..... 463/42
6,860,810 B2 * 3/2005 Cannon et al. ..... 463/20
6,869,361 B2 3/2005 Sharpless et al. ..... 463/25
6,887,154 B1 5/2005 Luciano, Jr. et al.
6,908,390 B2 6/2005 Nguyen et al.
7,077,744 B2 7/2006 Cannon
7,147,557 B1 12/2006 Tracy et al.
7,169,041 B2 1/2007 Tessmer et al.
7,241,220 B2 * 7/2007 Rothkranz et al. ..... 463/20
7,341,513 B2 * 3/2008 Cuddy et al. ..... 463/20
7,775,873 B2 8/2010 Aoki et al. ..... 463/20
2001/0038178 A1 * 11/2001 Vancura ..... 273/274
2002/0010025 A1 1/2002 Kelly et al.
2002/0039923 A1 4/2002 Cannon et al.
2002/0107062 A1 8/2002 Wong ..... 463/9
2002/0119824 A1 8/2002 Allen
2002/0138594 A1 9/2002 Rowe ..... 709/219
2002/0151345 A1 10/2002 Byrne ..... 463/18
2002/0155874 A1 10/2002 Byrne ..... 463/16
2003/0027618 A1 2/2003 Byrne ..... 463/16
2003/0036430 A1 2/2003 Cannon ..... 463/42
2003/0045337 A1 3/2003 Byrne ..... 463/16
2003/0050106 A1 3/2003 Lyfoung ..... 463/13
2003/0060264 A1 3/2003 Chilton et al.
2003/0064776 A1 4/2003 Byrne ..... 463/16
2003/0064807 A1 4/2003 Walker et al. ..... 463/42
2003/0100361 A1 5/2003 Sharpless et al. ..... 463/25
2003/0114218 A1 6/2003 McClintic
2003/0119576 A1 6/2003 McClintic et al.
2003/0148808 A1 8/2003 Price ..... 463/27
2003/0181231 A1 9/2003 Vancura et al. ..... 463/9
2003/0186733 A1 10/2003 Wolf et al. ..... 463/16
2003/0216166 A1 11/2003 Baerlocher et al. ..... 463/20
2003/0222402 A1 12/2003 Olive ..... 273/292
2003/0224852 A1 12/2003 Walker et al. ..... 463/20
2003/0228899 A1 12/2003 Evans ..... 463/25
2003/0236116 A1 12/2003 Marks et al. ..... 463/16
2004/0009808 A1 1/2004 Gauselmann ..... 463/25
2004/0009811 A1 1/2004 Torango ..... 463/25
2004/0038741 A1 2/2004 Gauselmann ..... 463/42
2004/0048644 A1 3/2004 Gerrard et al. ..... 463/16
2004/0087368 A1 5/2004 Gauselmann
2004/0106448 A1 6/2004 Gauselmann ..... 463/25
2004/0204226 A1 10/2004 Foster et al. ..... 463/20
2004/0204235 A1 10/2004 Walker et al. ..... 463/29
2004/0229700 A1 11/2004 Cannon et al.
2004/0235552 A1 11/2004 Gauselmann ..... 463/16
2004/0242297 A1 12/2004 Walker et al. ..... 463/13
2004/0242303 A1 12/2004 Walker et al. ..... 463/16
2005/0003886 A1 1/2005 Englman et al.
2005/0014554 A1 1/2005 Walker et al. ..... 463/20

(56) References Cited

U.S. PATENT DOCUMENTS

| | | | | |
|---|---|---|---|---|
| 2005/0020352 | A1 | 1/2005 | Chilton et al. | |
| 2005/0026674 | A1 | 2/2005 | Wolf et al. | 463/16 |
| 2005/0043088 | A1 | 2/2005 | Nguyen et al. | |
| 2005/0043089 | A1 | 2/2005 | Nguyen et al. | |
| 2005/0043094 | A1 | 2/2005 | Nguyen et al. | |
| 2005/0071024 | A1 | 3/2005 | Henshaw | |
| 2005/0102047 | A1 | 5/2005 | Ottofy | |
| 2005/0148380 | A1 | 7/2005 | Cannon et al. | |
| 2006/0009283 | A1 | 1/2006 | Englman et al. | |
| 2006/0073897 | A1 | 4/2006 | Englman et al. | |
| 2006/0121971 | A1* | 6/2006 | Slomiany | G07F 17/32 463/16 |
| 2006/0135243 | A1 | 6/2006 | Englman et al. | |
| 2006/0160625 | A1 | 7/2006 | Englman et al. | |
| 2006/0189378 | A1 | 8/2006 | Aoki | |
| 2006/0211479 | A1 | 9/2006 | Walker et al. | |
| 2006/0211480 | A1 | 9/2006 | Walker et al. | |
| 2006/0217176 | A1 | 9/2006 | Walker et al. | |
| 2006/0240887 | A1 | 10/2006 | Walker et al. | |
| 2006/0240889 | A1 | 10/2006 | Walker et al. | |
| 2006/0247012 | A1 | 11/2006 | Walker et al. | |
| 2006/0287043 | A1 | 12/2006 | Englman et al. | |

FOREIGN PATENT DOCUMENTS

| | | | | |
|---|---|---|---|---|
| DE | 196 24 321 | A1 | 1/1998 | G07F 17/32 |
| EP | 0 521 599 | A1 | 1/1993 | G07F 17/34 |
| GB | 2 153 572 | A | 8/1985 | G07F 17/34 |
| GB | 2 181 589 | A | 4/1987 | G07F 17/34 |
| GB | 2 242 300 | A | 9/1991 | G07F 17/34 |
| GB | 2 313 792 | A | 10/1997 | A63F 5/00 |
| GB | 2 333 880 | | 8/1999 | G07F 17/34 |
| WO | WO 99/03078 | A1 | 1/1999 | G07F 17/34 |
| WO | WO 99/19037 | A1 | 4/1999 | |
| WO | WO 01/32276 | A2 | 5/2001 | |
| WO | WO 01/33478 | A1 | 5/2001 | G06F 19/00 |
| WO | WO 02/094399 | A2 | 11/2002 | |
| WO | WO 03/026754 | A1 | 4/2003 | A63F 5/00 |
| WO | WO 03/083789 | A1 | 10/2003 | |
| WO | WO 2004/025585 | A2 | 3/2004 | |
| WO | WO 2005/010834 | A1 | 2/2005 | |
| WO | WO 2005/029279 | A2 | 3/2005 | |
| WO | WO 2005/077480 | A1 | 8/2005 | |
| WO | WO 2005/110563 | A2 | 11/2005 | |
| WO | WO 2005/113088 | A1 | 12/2005 | |
| WO | WO 2006/015442 | A1 | 2/2006 | |
| WO | WO 2006/028740 | A2 | 3/2006 | |
| WO | WO 2006/121663 | A2 | 11/2006 | |
| WO | WO 2006/124441 | A2 | 11/2006 | |
| WO | WO 2007/006002 | A2 | 1/2007 | |
| WO | WO 2007/030552 | A2 | 3/2007 | |
| WO | WO 2007/030632 | A2 | 3/2007 | |
| WO | WO 2007/030675 | A2 | 3/2007 | |
| WO | WO 2007/030733 | A2 | 3/2007 | |
| WO | WO 2007/030801 | A2 | 3/2007 | |
| WO | WO 2007/032945 | A2 | 3/2007 | |
| WO | WO 2007/047977 | A1 | 4/2007 | |
| WO | WO 2007/106124 | A2 | 9/2007 | |
| WO | WO 2008/039403 | A2 | 4/2008 | |
| WO | WO 2008/045398 | A2 | 4/2008 | |
| WO | WO 2008/045464 | A2 | 4/2008 | |
| WO | WO 2008/048634 | A2 | 4/2008 | |
| WO | WO 2008/051796 | A2 | 5/2008 | |

OTHER PUBLICATIONS

Article for "Easy Riches" by Sigma Game, Strictly Slots, 1 page (Aug. 2001).

Article for "Millioniser" by Glenn Haussman, Strictly Slots, pp. 50-53 (Mar. 2004).

Product Sheet for "Big Games Safari," IGT, 24 pages (2000).

"New '97 Games," International Gaming & Wagering Business, 24 pages (Mar. 1997).

Written Opinion of the International Searching Authority corresponding to International Patent Application No. PCT/US2007/10049, dated Sep. 4, 2008, 5 pages.

International Search Report corresponding to International Patent Application No. PCT/US2007/10049, dated Sep. 4, 2008, 2 pages.

* cited by examiner

COMMUNITY WAGERING GAME WITH MULTIPLE PLAYER SELECTIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a U.S. national phase of International Application No. PCT/US2007/010049, filed Apr. 26, 2007, which claims the benefit of priority of U.S. Provisional Patent Application No. 60/795,631, filed Apr. 27, 2006, both of which are incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having a community bonus game wherein players at linked gaming machines make selections during play of the community bonus game and earn awards based on their respective selections. Gameplay associated with each players' selections is viewed on a community display that is coupled to the linked gaming machines.

BACKGROUND OF THE INVENTION

Gaming machines, such as slot machines, video poker machines and the like, have been a cornerstone of the gaming industry for several years Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide s greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

In particular, bonus games that allow participation by a number of players are especially attractive as such games generate additional player excitement and anticipation. Players playing in a community-type bonus game are affected by the outcomes of other players' selections and thus become more involved in the gaming experience.

SUMMARY OF THE INVENTION

According to one aspect of the present invention, a gaming system includes a plurality of linked gaming machines which are operable to receive wagers from players. Each linked gaming machine includes a display for displaying a basic wagering game. Upon the occurrence of a special event at any one of the plurality of linked gaming machines, each of the eligible linked gaming machines is allowed to participate in a community bonus game. The community bonus game receives a player selection from multiple ones of the eligible linked gaming machines such that the player selections affect the outcome of the community bonus game.

According to another aspect of the invention, a method of conducting a community wagering game on a gaming system having a plurality of linked gaming machines includes displaying a wagering game at each of the linked gaming machines and initiating a community bonus game upon the occurrence of a special event. The community bonus game is displayed to all players playing at the linked gaming machines. The method further includes receiving a plurality of selections from multiple players in the community bonus game and awarding an award to players at the linked gaming machines based on the player selections.

According to yet another aspect of the invention, a computer readable storage medium is encoded with instructions for directing a gaming system to perform the above method.

According to a further aspect of the invention, a gaming system includes a plurality of linked gaming machines and a controller coupled to the plurality of linked gaming machines. The controller is operative to initiate a community bonus game based on the occurrence of a special event, allow players at the plurality of linked gaming machines to make alternating selections of a group of symbols associated with the community bonus game, determine if the player-selected symbols are associated with awards and continue play of the community bonus game until a bonus-game-terminating outcome is selected.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
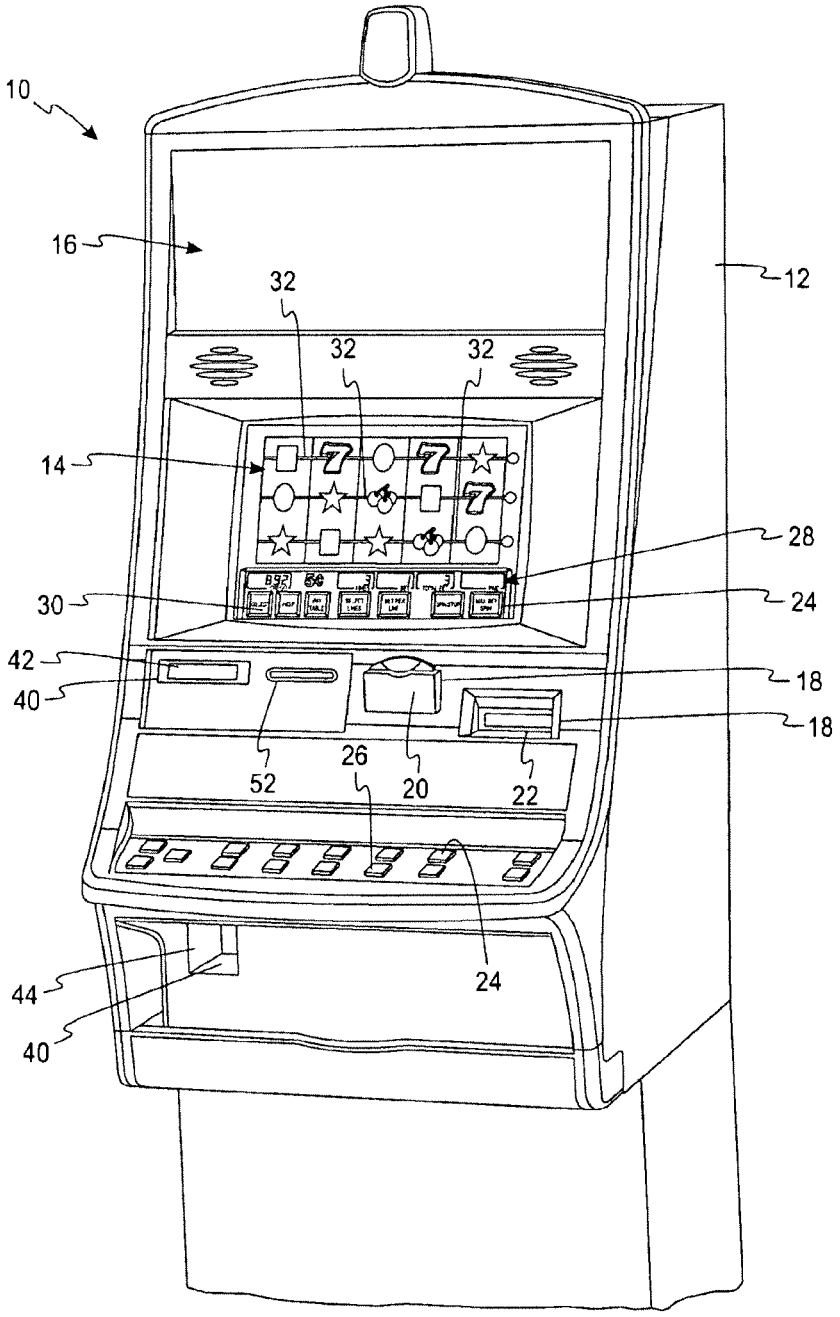
FIG. 1a is a perspective view of a free standing gaming machine embodying the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1a, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1a). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1a, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1a as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
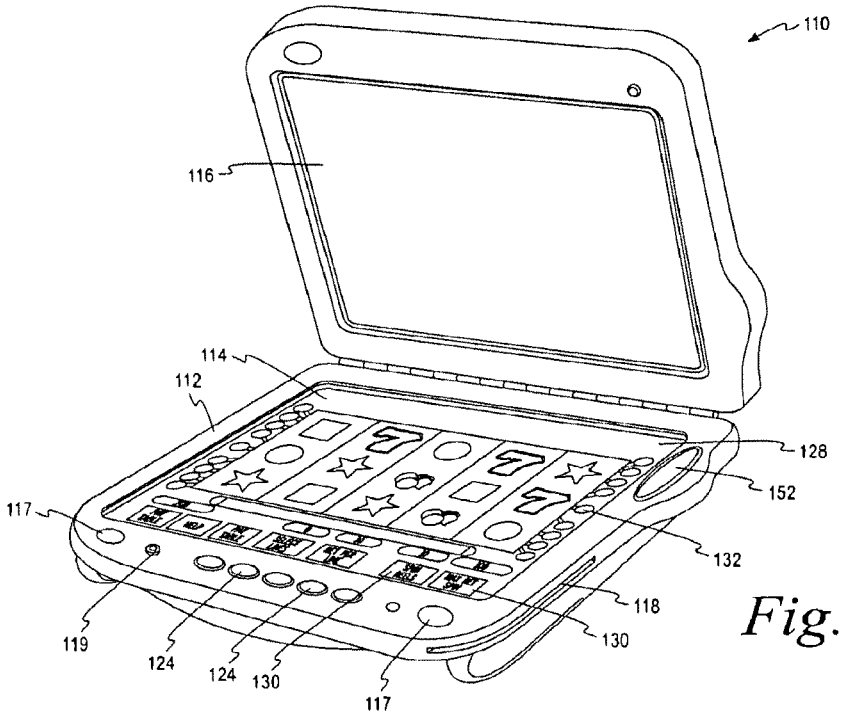
FIG. 1b is a perspective view of a handheld gaming machine embodying the present invention.

Depicted in FIG. 1b is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1b, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1b, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1b, comprises a biometric sensing device.

Figure 2:
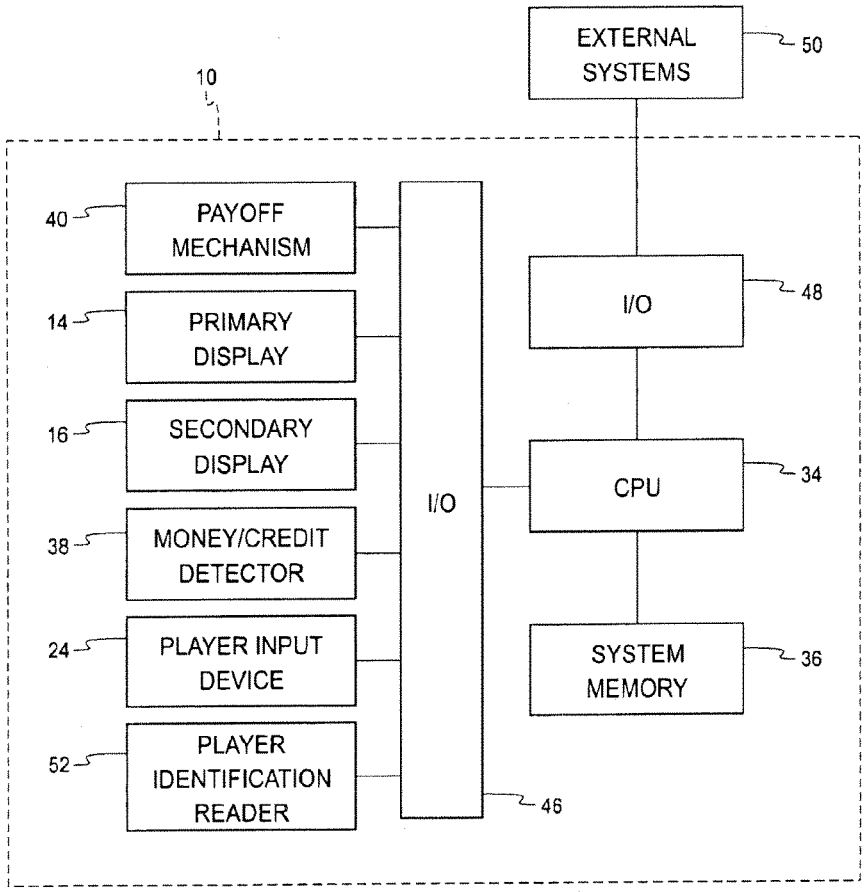
FIG. 2 is a block diagram of a control system suitable for operating the gaming machines of FIGS. 1a and 1b.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1a, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

While the gaming machines 10 of FIGS. 1a and 1b have been described with respect to a single wagering game providing a basic game and a bonus game, the gaming machine 10 may be connected, or linked, to other gaming machines 10. According to one embodiment depicted in FIG. 3, a gaming system 160 of linked gaming machines 10a, 10b, 10c, 10d is shown. The gaming machines 10a-d are of the free-standing type described above in relation to FIGS. 1a and 2, but may also include handheld or mobile gaming machines 110 of the type described in relation to FIG. 1b. The gaming machines 10a-d are interconnected and may display the same or different basic wagering game. The gaming machines 10a-d are positioned proximate signage 162 that includes a community display 163 for displaying a community bonus game 164. In the embodiment shown in FIG. 3, a variety of community bonus games 164a-e may be displayed on the community display 163. In preferred embodiments, only one community bonus game 164 will be displayed at a time on the community display 163.

Figure 3:
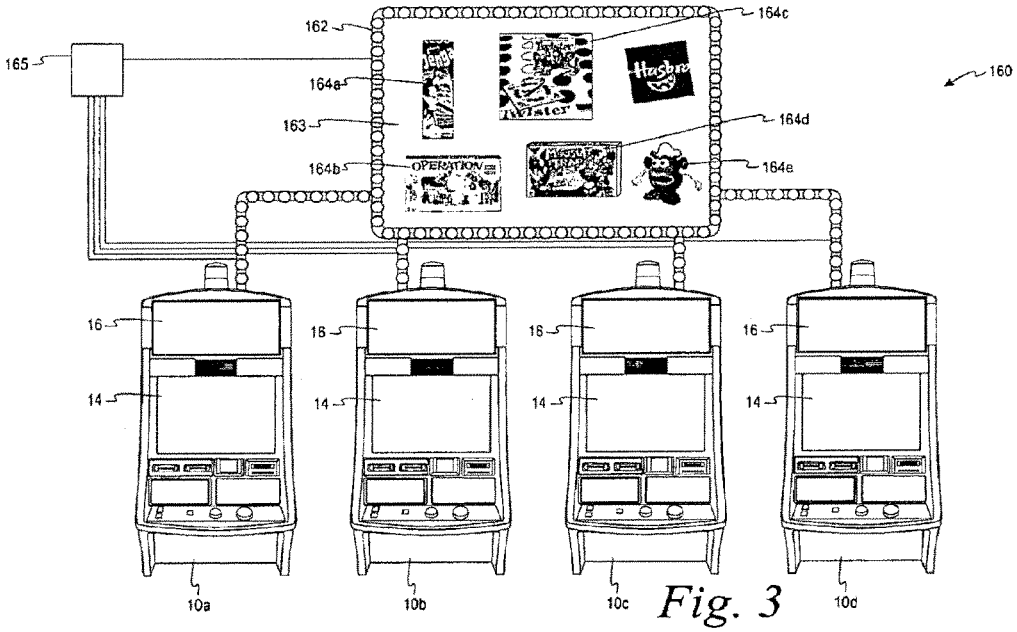
FIG. 3 is a perspective view of a set of linked gaming machines coupled to a community display.
Figure 4:
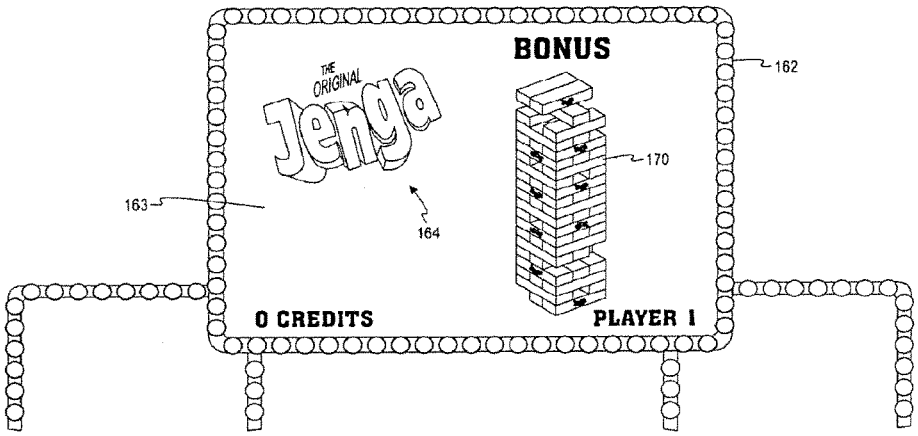
FIG. 4 is a perspective view of the community display displaying a community bonus game according to one embodiment of the present invention.

The community display 163 is able to be viewed by all players at the linked gaming machines 10a-d. While four linked gaming machines 10a-d are shown in FIG. 3, it is contemplated that more or fewer gaming machines can be linked together in the gaming system 160 and that the linked gaming machines 10a-d may be remote from each other. Moreover, the community display 163 may comprise a plurality of displays positioned in various locations each displaying the same or different images. Alternatively, the community display 163 may comprise a plurality of displays positioned proximate to one another so as to display a single unified image, or may be a single display as shown in FIG. 3. The gaming system 160 may include a controller 165 for assisting in the control of, or completely controlling, a special event. The community controller 165 may also assist in displaying the community bonus game 164 on the community display 163. In some embodiments, each of the gaming machines 10a-d may also display the special event on the primary display 14 and/or on the secondary display 16.

In the embodiment of FIG. 3, the signage 162 and community controller 165 can be part of the external system 50 in FIG. 2. The community controller 165 is coupled to the controller 34 (FIG. 2) of each of the gaming machines 10a-d and the controller 34 transmits information to and receives information from the community controller 165. In one embodiment, the controller 34 receives a special-event-triggering signal associated with a special event that is achieved by at least one of the linked gaming machines 10a-d. The community controller 165 then transmits a special-event-play signal to the linked gaming machines 10a-d. The special-event-play signal may then initiate play of the community bonus game 164.

The special event may be triggered by a variety of outcomes including, but not limited to, a special outcome at one of the linked gaming machines 10a-d (displayed as a special symbol combination), a bonus outcome at one of the linked gaming machines 10a-d (displayed as a single bonus symbol or combination of bonus symbols), etc. The special event may also be triggered when a certain amount of time has lapsed since the last special event, at fixed intervals, when a certain sum of wager inputs have been received at the linked gaming machines 10a-d, when a certain number of additional or maximum wagers are received at the linked gaming machines 10a-d, etc. The special event may also be triggered so as to be awarded randomly as a "mystery bonus" to one or more players of the linked gaming machines 10a-d. In some cases, only certain players will be eligible to play the community bonus game 164. Player eligibility to participate in the community bonus game 164 may be based on random player selection or may be based on predetermined criteria, such as the amount or number of additional or maximum wagers, the time since last playing a community bonus game 164, etc. Alternatively, all players playing at the linked gaming machines 10a-d may be eligible.

The community bonus game 164 that is displayed to players at the linked gaming machines 10a-d on the community display 163 may include features for selecting objects or symbols displayed in the community bonus game 164. For example, as shown in FIGS. 4-9, and as described herein, a community bonus game 164 may include a selection feature that allows players at the linked gaming machines 10a-d to select objects or symbols that are associated with bonus awards. In some embodiments, players at the linked gaming machines 10a-d may take turns selecting an object from a plurality of objects that are associated with the community bonus game 164. In this manner, a player's selection of an object may be affected by prior selections made by other players since prior player selections may influence what selections are available and/or desirable to a subsequent player. This interaction, based on alternating or sequential player selections, provides for a more communal experience for the players as they root for other players to make selections that are favorable to their subsequent selections.

In one illustration, shown in FIGS. 4-8, players take turns selecting blocks 170 from a set of blocks in a JENGA® bonus game 164. The blocks 170 are stacked in a criss-crossing fashion such that they appear as a small tower of blocks 170. Players generally take turns removing the blocks, one at a time, from the stack or tower. In one embodiment, the players may make alternating or sequential selections of the blocks 170. The JENGA® bonus game 164 may be displayed on the community display 163 such that all players at the linked gaming machines 10a-d are able to view the community bonus game. Alternatively, or additionally, the JENGA® bonus game 164 is displayed on the primary display and/or the secondary display 16 of the individual linked gaming machines 10a-d.

The selection of the blocks 170 may occur via the player input device 24. As described above, the player input device 24 may include a plurality of push buttons 26 on a button panel or a touch screen 28 mounted by adhesive, tape, or the like over the primary display 14 and/or the secondary display 16. The touch screen 28 may contain soft touch keys 30 denoted by graphics on the underlying primary display 14. Thus, a player makes a selection by touching the touch screen 28 at an appropriate touch key 30 or by pressing an appropriate push button 26 on the button panel.

Figure 5:
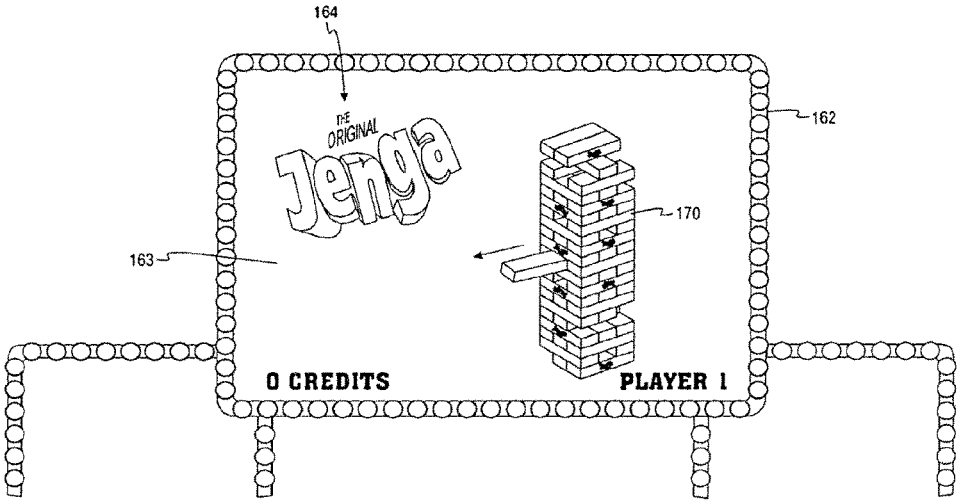
FIG. 5 is a perspective view of the community display showing a first player selecting an object associated with the community bonus game according to one embodiment of the present invention.
Figure 6:
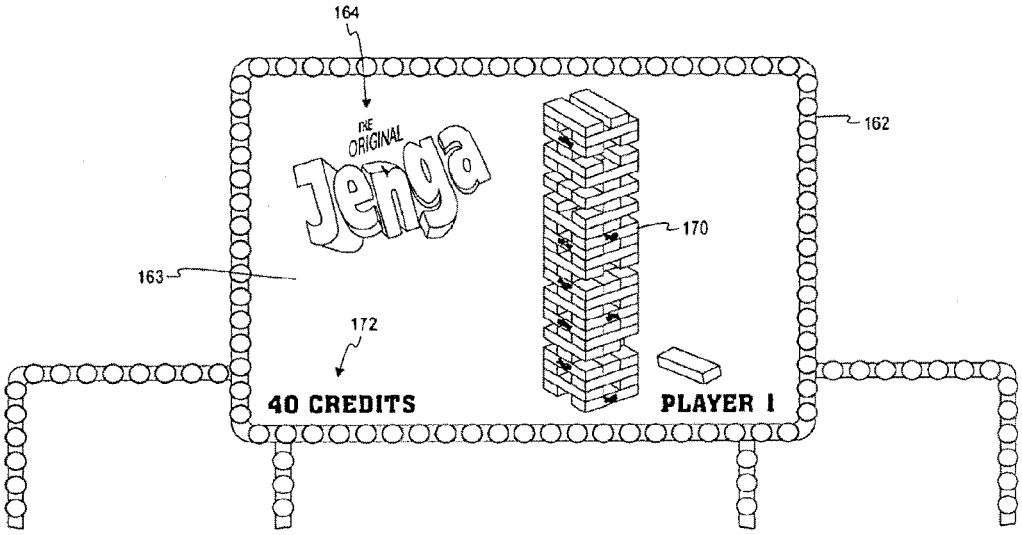
FIG. 6 is a perspective view of the community display showing the first player receiving a credit award according to one embodiment of the present invention.

Upon selection of a block, as shown in FIG. 5, a player is awarded a bonus award, such as a credit award, free spin, etc. The selection of the block in FIG. 5 is shown as a particular block being pulled out from the set of blocks to represent the player's selection. However, any number of methods may be used to show selection of a particular object by a player. As shown in FIG. 6, the selection is associated with a bonus award 172 of 40 credits. In some embodiments, only the player who selected the block may receive the bonus award 172, i.e. "Player 1." Alternatively, the bonus award 172 may be awarded to each player playing in the community bonus game 164. In some embodiments, players may receive a multiple of the bonus award 172. This multiplier may be based on any number of criteria, such as the length of game play, the amount of wagers made, the number of paylines bet, etc., and may be the same or different for each player.

In other embodiments, the award may be shared by the players. If shared, the award may be proportioned to the players based on wager inputs made by the players. In other embodiments where the award is shared by the players, each player may be given an equal credit award. As noted above, in some embodiments; a multiplier may be used to increase the individual or shared bonus awards. These multipliers may be specific to a linked gaming machine 10a-d or may depend on such factors as a player's amount or level of wagering, time of play at the linked gaming machine, etc. Alternatively, the multipliers may be applied in a random manner to any or all of the linked gaming machines 10a-d.

Figure 7:
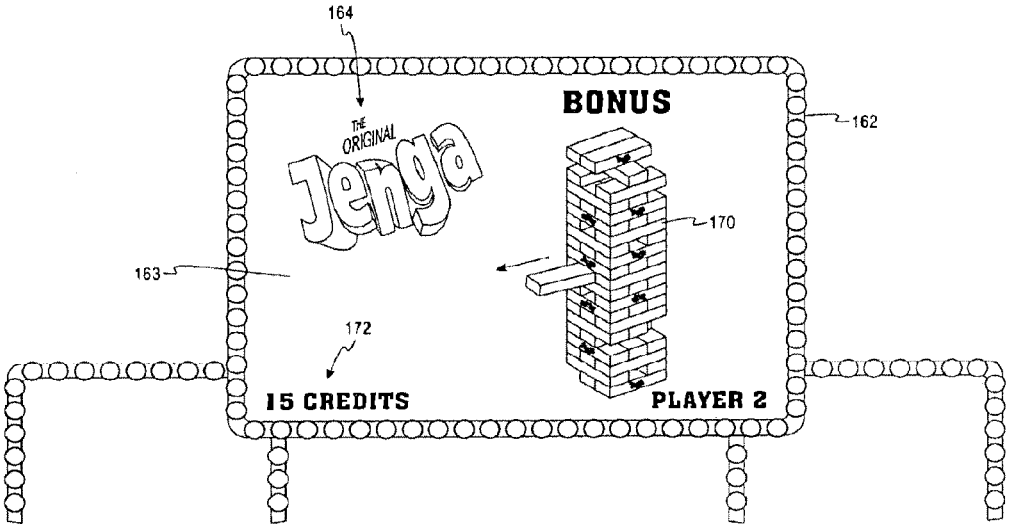
FIG. 7 is a perspective view of the community display showing a second player selecting an object associated with the community bonus game according to one embodiment of the present invention.
Figure 8:
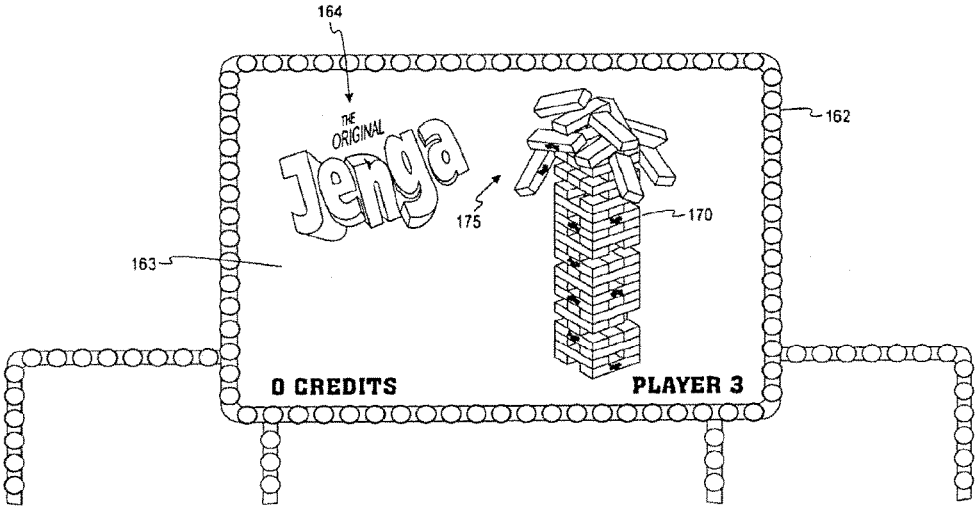
FIG. 8 is a perspective view of the community display showing a third player selecting a bonus-game-terminating object associated with the community bonus game according to one embodiment of the present invention.
Figure 9:
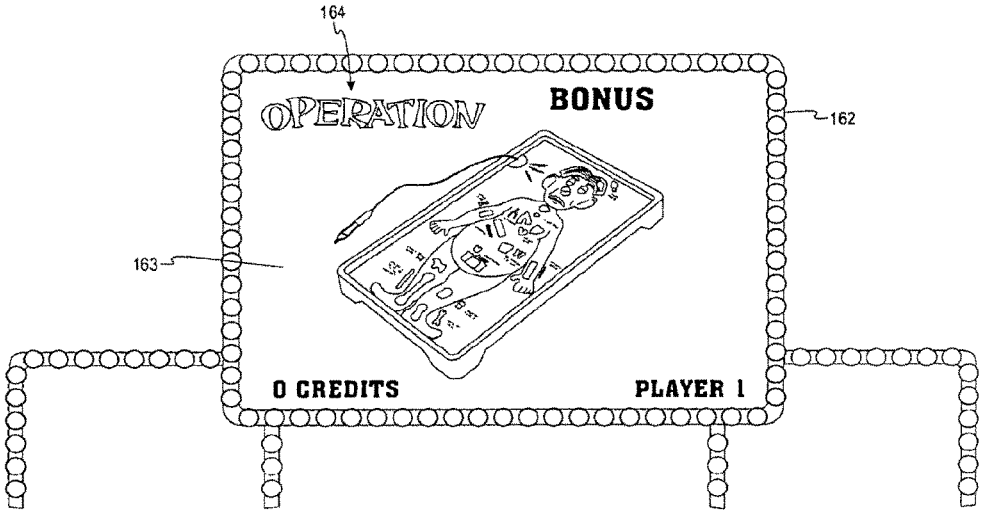
FIG. 9 is a perspective view of the community display showing a community bonus game according to another embodiment of the present invention.

Upon Player 1's selection of a block (or any other selectable object associated with the community bonus game 164 that is displayed), another player ("Player 2") is able to make a selection and is awarded a corresponding bonus award 172, i.e., 15 credits, as shown in FIG. 7. The next player ("Player 3") is then allowed to make a selection and this process continues until a player selects a bonus-game-terminating object 175 that results in the community bonus game 164 coming to an end. In the JENGA® example, a bonus-game-terminating object 175 is selected which causes the array of blocks 170 to tumble down and terminate the community bonus game 164, as shown in FIG. 8. At this point, the players at the linked gaming machines 10a-d resume their individual games at each of the linked gaming machines 10a-d. The individual games will commence at the point that they left off to take part in the community bonus game 164. Once the community experience ends, the players must wait until the next special event to be able to participate in a subsequent community bonus game 164.

Alternatively, in some embodiments, the selection of the bonus-game-terminating object 175 may only terminate play of the community bonus game 164 for the player who made the selection. The other players who have not yet selected a bonus-game-terminating object 175 may continue to play the community bonus game 164. Some games that may have such a bonus-game-terminating event may include, but are not limited to, MONOPOLY® (where a single player may go to jail or become bankrupt), RISK® and SIMON SAYS (where a player is eliminated based on an "incorrect" selection), or other games such as HORSE (where a players misses a "basketball shot"). Once an individual player is eliminated, the eliminated player may begin play of the basic game at the point where the player left off to take part in the community bonus game 164.

As mentioned above, the special event that is associated with the initiation of the community bonus game 164 can be randomly triggered by the community controller 165. Alternatively, the special event may be randomly triggered by an outcome at any of the individual gaming machines 10a-d upon achieving, for example, a start-special-event outcome. In the embodiments shown in FIGS. 4-9, once the special event is achieved, the community bonus game 164 is displayed on the community display 163. However, in other alternatives, the linked gaming machines 10a-d may display the community wagering game 164 on the primary display 14 or secondary display 16, in addition to or instead of displaying the community bonus game 164 on the community display 163. In this case, players' selections may still be displayed such that players can follow along on their respective primary display 14 or secondary display 16.

When the community bonus game 164 is triggered by a special event, all eligible players at the linked gaming machines 10a-d may participate in the community bonus game 164. Eligibility requirements may include (1) playing a wagering game at a gaming machine 10a to 10d, (2) wagering at a certain level, (3) achieving a certain player status, etc. Eligibility requirements, however, are not necessary for the present invention.

The selectable objects may include any type of object, such as a card, figure, symbol, block, etc., depending on the community bonus game 164 being displayed. For example, in accordance with the community bonus game 164 displayed in FIG. 9, players take turns selecting "body parts" to remove from a patient in an OPERATION® game. Players continue making selections until a bonus-game-terminating outcome occurs. For each "body part" to be removed, the player may be required to select certain inputs yielding certain outcomes. For example, the player may be required to select which region of the "body part" a "surgical tool" will attempt to grasp.

The community bonus game 164 may be based on various board games in addition to the games described above, such as TWISTER®, MOUSE TRAP GAME®, MR. POTATO HEAD®, etc. For example, in TWISTER®, players take turns selecting colors and/or locations such that the players take certain positions based on their selections. When a player makes a selection that would cause other players to loose their position, then a bonus-game-terminating outcome has occurred. Moreover, in MOUSE TRAP GAME®, the players take turns making selections until a selection is made that causes the mouse trap to fall and terminate game play. Similarly, in MR. POTATO HEAD®, players make selections of body parts to place on MR. POTATO HEAD® until a body part associated with a bonus-game-terminating outcome occurs.

Other wagering games that may be used with the present invention may include card games (such as "GO FISH") or other well-known games such as "Pick up sticks" or Dodge Ball." Other wagering games that may be used with the present invention include action or adventure games. In these types of games, players may make selections of objects that control a character's actions, such as selecting different roads to go down, doors/boxes to open, targets to shoot, enemies to attack, etc. The types of games listed herein are not meant to limit the types of possible games that may be used with the present invention. Instead, it is contemplated that any game involving the selection of objects can be used with the present invention.

As described above, the selectable objects may be displayed to players on the individual linked gaming machines 10a-d or on the community display 163. As players make their selections, i.e., as alternating or sequential selections, the bonus awards 172 associated with the selected objects are revealed. Each player preferably selects a single object, but may alternatively be allowed to select more than one object and be awarded multiple bonus awards. The bonus awards associated with any unselected objects may also be revealed so that the players can view what they would have been awarded had they made different selections.

While in some embodiments the community controller 165 may receive players inputs and reveal bonus awards, it is also possible to have one or more of the controllers 34 in the linked gaming machines 10a-d perform these functions. This configuration may be referred to as the "master" and "slave" configuration such that one gaming machine (i.e., 10a) is the "master" that receives the inputs and transmits the information to the other gaming machines 10b-d (i.e., the "slave" gaming machines).

Some selections of objects from the community bonus game 164 may be associated with additional awards. These awards may be awarded to only a single player or to all players of the community bonus game 164. For example, if a player selects a "WILD" object, all players may receive a random credit award based on the selection of the "WILD" object. In addition to the objects described herein, other embodiments of the present invention may contain various types of selectable objects. The selectable objects may be displayed in any manner, shape or form and are not limited by the embodiments described herein. Furthermore, the bonus awards 172 that are received by players according to the present invention have been described herein in terms of monetary awards, i.e., credits. It is also contemplated that non-monetary awards may be awarded to players in association with the selected objects in the community bonus games 164.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming system comprising:

a plurality of linked gaming machines [being operable to receive wagers from players], each linked gaming machine including a display for displaying a basic wagering game *and an input device configured to detect a physical item associated with a monetary value establishing a credit balance on the respective gaming machine, each linked gaming machine of the plurality initiating the basic wagering game in response to an input indicative of a wager drawn on the credit balance;*

*one or more controllers in communication with the plurality of linked gaming machines*; and wherein upon the occurrence of a special event at any one of the plurality of linked gaming machines, each of the eligible linked gaming machines being allowed to participate in a community bonus game *executed by one of the one or more controllers*, the community bonus game receiving a [player selection from multiple] *plurality of alternating-player selections at respective* ones of the eligible linked gaming machines, [each of the player selections affecting the outcome of] *and* the community bonus game *sharing an award among all players at each of the eligible linked gaming machines in response to a selection that is not a bonus-terminating selection*.

2. The gaming system of claim 1, wherein the [player] *alternating-player* selections [occur as sequential selections] *are* from a set of objects or symbols displayed in the community bonus game, the [sequential] selections [occurring as] *alternating between* a first selection via a first player [and], a second selection via a second player, *and a third selection via the first player*.

3. The gaming system of claim 1, further comprising a community display coupled to the plurality of linked gaming machines for displaying the community bonus game.

4. The gaming system of claim 3, wherein the community display is located on signage proximate at least a portion of the linked gaming machines.

5. The gaming system of claim 4, wherein the players make [sequential] selections of symbols or objects displayed in the community bonus game, the [sequential] selections [occurring as] *alternating between* a first selection via a first player and a second selection via a second player.

~~[6. The gaming system of claim 1, wherein each player receives an award based on individual player selections of symbols or objects made by that player.]~~

7. The gaming system of claim 1, wherein the total [award] *awards* for all players are shared among the players playing at the linked gaming machines.

8. The gaming system of claim 7, wherein the shared awards are proportional based on the individual wagers made at the linked gaming machines.

9. The gaming system of claim 1, wherein [the] *a* controller coupled to the linked gaming machines triggers the special event.

10. A method of conducting a community wagering game on a gaming system having a plurality of linked gaming machines, *each of the linked gaming machines including an input device configured to detect a physical item associated with a monetary value establishing a credit balance on the respective linked gaming machine,* the method comprising:

displaying a wagering game at each of the linked gaming machines *in response to an input indicative of a wager drawn on the credit balance on the respective linked gaming machine*;

initiating a community bonus game upon the occurrence of a special event, the community bonus game being displayed to all players playing at the linked gaming machines;

receiving a plurality of selections from multiple players *taking alternating turns selecting* in the community bonus game, each of the plurality of selections from affecting [the outcome] *one or more bonus awards awarded to one or more players* of the community bonus game; and

[awarding] *sharing* an award [to] *among all of the multiple* players [at the linked gaming machines based on the player selections] *in response to a selection that is not a bonus-terminating selection.*

11. The method of claim 10, wherein the community bonus game is displayed on a community display positioned proximate at least a portion of the linked gaming machines.

12. The method of claim 10, wherein [receiving multiple] *the plurality of* player selections [includes receiving sequential selections from players at the linked gaming machines] *are from a set of objects or symbols displayed in the community bonus game*, the [sequential] *player* selections [occurring as] *alternating between* a first selection via a first player [and], a second selection via a second player, *a third selection via the first player, and a fourth selection via the second player*.

13. The method of claim 10, further comprising terminating play of the community bonus game upon receiving a selection associated with a bonus-game-terminating outcome.

14. The method of claim 13, *wherein the plurality of player selections are from a set of objects or symbols displayed in the community bonus game, the method* further comprising revealing the value associated with at least one unselected [selection] *object or symbol*.

15. The method of claim 10, wherein the [awarding] *award* includes applying a multiplier to the award associated with a player selection at one of the linked gaming machines.

16. The method of claim 15, wherein the value of the multiplier is dependent on wagers made at the linked gaming machines.

~~[17. The method of claim 10, wherein the awarding includes providing each individual player with an award based on the selection made by that player.]~~

18. The method of claim 10, wherein the [awarding] *award* includes providing a shared award to a group of players playing at the linked gaming machines.

19. A gaming system comprising:

a plurality of linked gaming machines*, each linked gaming machine including an input device configured to detect a physical item associated with a monetary value establishing a credit balance on the respective gaming machine, each linked gaming machine of the plurality initiating a basic wagering game in response to an input indicative of a wager drawn on the credit balance*;

a controller coupled to the plurality of linked gaming machines and operative to*:* initiate a community bonus game based on an occurrence of a special event, the community bonus game including a group of symbols on a display;

allow players at the plurality of linked gaming machines to make alternating selections from the group of symbols on the display associated with the community bonus game;

[determine if the player-selected symbols are associated with awards] *receive, by the controller, a plurality of selections from the players;*

*share an award among the players in response to a selection that is not a bonus-terminating selection*; and continue play of the community bonus game until a bonus-game-terminating outcome is selected.

20. The gaming system of claim 19, further comprising a community display positioned proximate at least a portion of the plurality of linked gaming machines and coupled to the controller, the community bonus game being displayed on the community display.

21. The gaming system of claim 19, wherein the special event is achieved by at least one of the linked gaming machines.

22. The gaming system of claim 19, wherein the alternating player selections are associated with one or more of credit awards, multipliers, and free picks.

* * * * *